D. M. COOPER.
STOP MECHANISM FOR MACHINERY.
APPLICATION FILED DEC. 30, 1909.
1,073,889.
Patented Sept. 23, 1913.
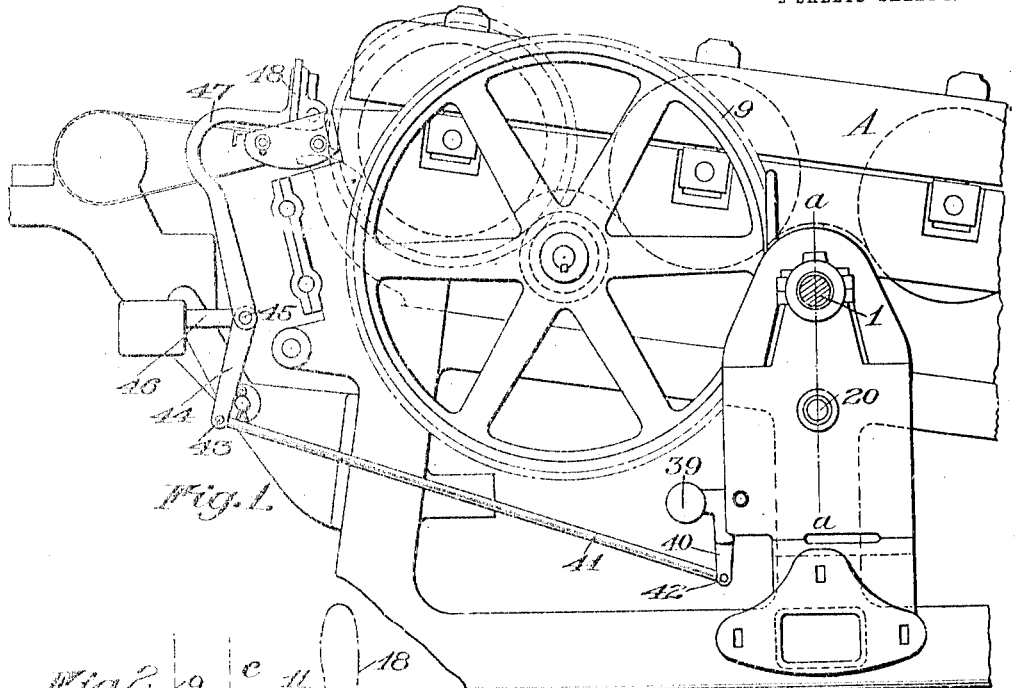
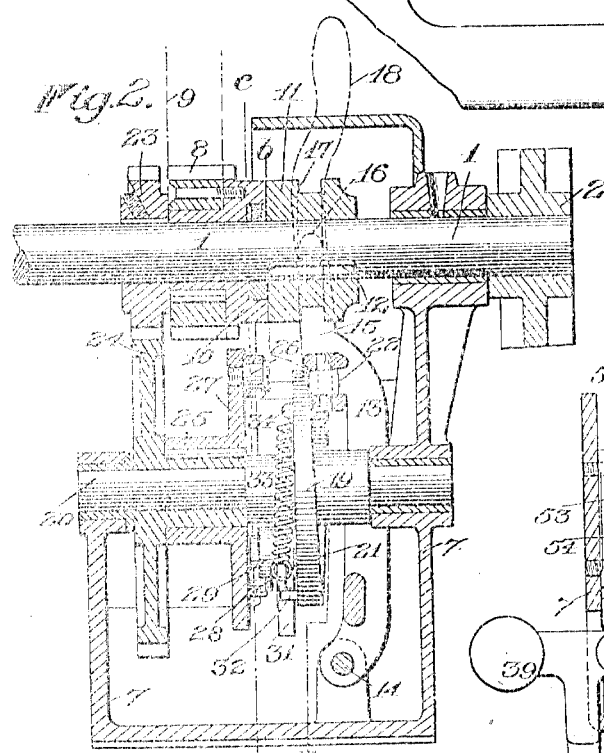
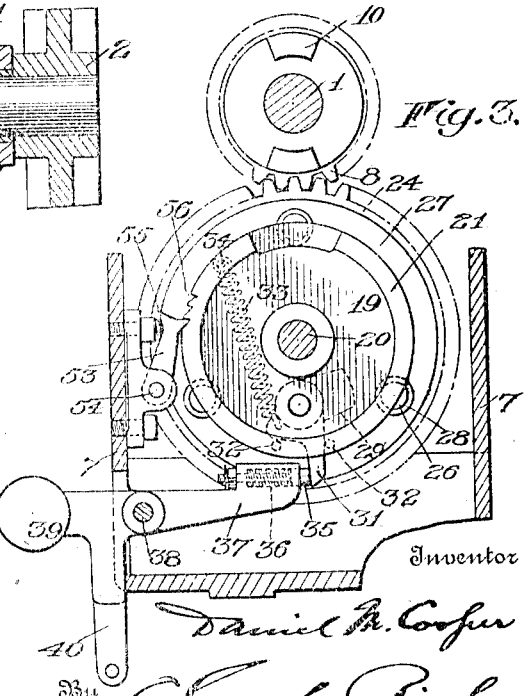

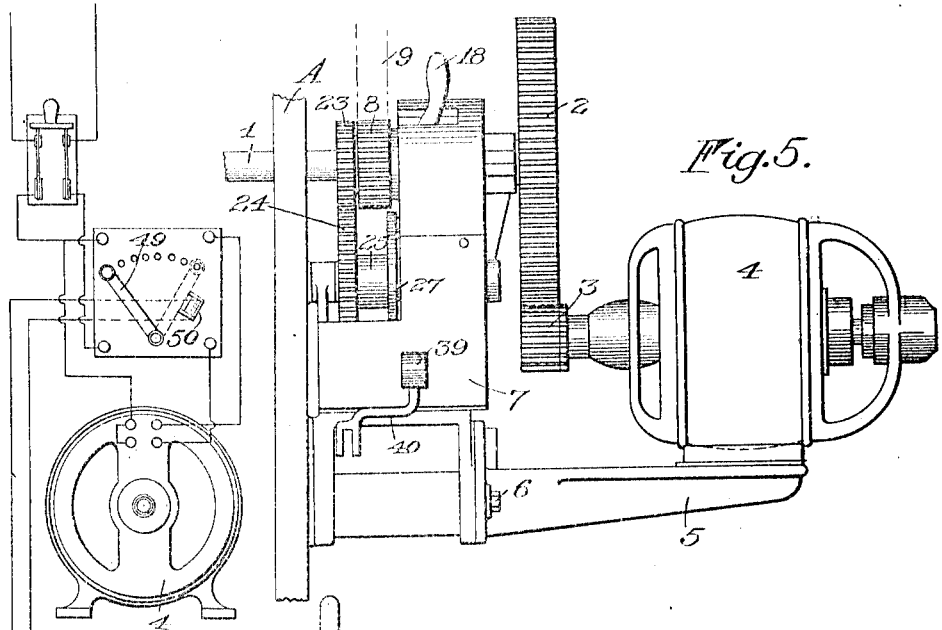

UNITED STATES PATENT OFFICE.

DANIEL M. COOPER, OF ROCHESTER, NEW YORK, ASSIGNOR TO THE AMERICAN LAUNDRY MACHINERY COMPANY, OF CHICAGO, ILLINOIS, A CORPORATION OF OHIO.

STOP MECHANISM FOR MACHINERY.

1,073,889.

Specification of Letters Patent.

Patented Sept. 23, 1913.

Application filed December 30, 1909. Serial No. 535,563.

*To all whom it may concern:*

Be it known that I, DANIEL M. COOPER, of Rochester, in the county of Monroe and State of New York, have invented certain new and useful Improvements in Stop Mechanisms for Machinery; and I do hereby declare the following to be a full, clear, and exact description of the same, reference being had to the accompanying drawings, forming a part of this specification, and to the reference-numerals marked thereon.

The present invention relates to stop mechanisms for machinery and has for an object to provide a construction which will utilize the driving power of the machine to be stopped for breaking connection between the driving and the driven parts, thus insuring a positive action of the stop mechanism.

To these and other ends the invention consists in certain improvements and combinations of parts all as will be hereinafter more fully described, the novel features being pointed out in the claims at the end of the specification.

In the drawings: Figure 1 is a side view of a portion of a mangle or ironing machine to which the present invention has been applied; Fig. 2 is a section on the line *a—a* of Fig. 1; Fig. 3 is a section on the line *b—b* of Fig. 2; Fig. 4 is a section on the line *c—c* of Fig. 2; Fig. 5 shows the stop mechanism in elevation with a driving motor connected thereto, and Fig. 6 is a detail horizontal view showing the switch for stopping the motor.

In this invention a shifter is operated to break connection between the driving and the driven parts whenever an abnormal condition exists in the machine to which the invention has been applied. The driving parts in this embodiment comprise a shaft 1 suitably supported and having a gear wheel 2 connected thereto and meshing with a pinion 3 on the shaft of the motor 4, the latter being supported in any suitable manner as on the bracket arm 5 detachably bolted at 6 to a stop mechanism frame 7 which is secured at one side of the machine to be stopped, such as a mangle A. The driven parts in this instance comprise a pinion 8 turning loosely upon the shaft 1 and meshing with the driving wheel 9 of the mangle A.

Connection between the driving and the driven parts may be established by a clutch comprising preferably a clutch member 10 on the driven pinion 8 and a clutch member or sleeve 11 surrounding the shaft 1 and guided longitudinally thereon as by a key 12. The clutch may be controlled by a shifter preferably comprising a lever 13 pivoted at its lower end at 14 within the frame or casing 7 and having its upper end yoked at 15 and provided with projections 16 lying within a groove 17 formed on the clutch member 11 and permitting the latter to rotate with the shaft 1 while maintaining its coöperative relation with the shifter. The shifter may also have a hand or grip portion 18 extending upwardly therefrom through the casing 7, permitting the manual operation of the clutch.

To the end that the shifter may be moved to break connection between the driving and the driven parts by means of the power driving the machine, there is employed a movable member 19 preferably in the form of a disk turning upon a shaft 20 that is supported at its ends in the side walls of the casing 7. This disk may have a cam surface 21 thereon for coöperation with the shifter 13, the latter preferably straddling the shaft 20 and carrying a friction roller 22 directly above the shaft 20. It is apparent that when the cam member 19 is rotated the shifter 13 will be moved to carry the clutch member 11 away from the clutch member 10.

Connection between parts moving with the machine to be stopped and the member 19 is in this instance established by a pinion 23 fixedly secured to the shaft 1 so as to turn therewith and meshing with a gear 24 on the rotary member 25 which turns on the shaft 26 so that its axis is coincident with the axis of turning of the member 19. This rotary member 25 may have one or more projections 26 extending laterally from the disk portion 27 of the rotary member and carrying friction rollers 28 with which operates a dog 29 preferably pivoted to the rotary member 19 and having an arm 31 extended beyond the periphery of said member 19, said arm being adapted to coöperate with stops 32 on member 19 to limit the movement of the dog 29 in two directions. The dog in this instance is moved into the path of the stops 26 by a helical spring 33 secured at one end at 34 to the member 19 and at its other end to the dog, thus giving the latter a normal tendency to engage with the projections on the rotary member 25.

In order to hold the dog out of the path of the projections, there may be provided a stop 35 yieldingly supported by a spring 36 on one arm of a bell crank lever 37 which is pivoted at 38 independently of the member to the casing 7 of the stop mechanism and is normally held by a weight 39 or other suitable means so that the stop 35 lies in the path of the arm 31 of the dog. The other arm 40 of the bell crank trip is controlled in any suitable manner. In this instance a pull bar 41 is pivoted at one end at 42 to the arm 40 and at its other end at 43 to the arm 44 on the rock shaft 45 which in turn carries a weighted arm 46 and is connected to an arm 47 of the finger board 48 of the machine.

Coöperation between the arm 31 and the stop 35 may be maintained by preventing the accidental rotation of the member 19 by suitable means such as a pawl 53 pivoted at 54 to the casing 7 and pressed toward the member 19 by a spring 55 so as to coöperate with one of the teeth or projections 56 formed on a portion of the periphery of the member 19, the remaining portions of the periphery being curved in order that the pawl may ride freely thereover.

It is desirable, with the breaking of the connection between the driving and driven parts, to stop the motor 4 and for this reason the controller 49 of the motor is normally pressed to "off" position by a suitable spring (not shown), while it is held in its "on" position by an electro-magnet 50 in shunt with the motor, adapted to be short circuited by a switch having one member 51 thereof secured to the stop mechanism casing 7 and the other member 52 carried by a shifter 13. It follows that when the shifter 13 is moved to break connection between the driving and the driven parts, the switch member 52 will engage the switch member 51 and short circuit the magnet 50, thus releasing the operating member 49 and permitting the latter to move to "off" position under the action of its spring.

In operation the shifter 13 is moved manually by means of its hand portion 18 to establish connection between the clutch members 10 and 11. The controller 49 is now moved until it is held by the electro-magnet 50, thus causing the mangle to be driven. If the operative should move her hand into engagement with the finger board 48 with sufficient force, then, through the means of the pull bar 41, the stop 35 will be moved out of engagement with the dog 31, permitting the dog to move into the path of the projections 26 so as to be engaged by one of them, it, of course, being understood that the rotary member 25 moves constantly during the running of the machine. The engagement between the projections 26 and the dog 29 causes the member 19 to be rotated and the cam 21 to move the shifter 13 so as to break connection between the clutch members 10 and 11 and to short circuit the magnet 50, thus not only breaking connection between the motor and the mangle but cutting off the motive power of the motor.

A stop mechanism constructed in accordance with this invention insures an almost immediate stopping of the machine and at the same time cuts off the motive power so that accidental starting of the machine is not possible. The parts for effecting these results are simple in operation and inexpensive to manufacture and their action is positive.

I claim as my invention:

1. A stop mechanism comprising a clutch shifter, a rotatable member having a projection thereon and movable with the machine to be stopped, a member having a cam surface thereon with which the shifter is engaged, said member being rotatable about the axis of rotation of the first named member and fixed on a normally stationary shaft, a dog carried by the second named rotatable member, and means for moving said dog into the path of the projection.

2. A stop mechanism comprising a shifter for breaking connection between a driven and a driving member, a rotatable member having a projection thereon and movable with the machine to be stopped, a movable member for moving the shifter, a dog carried by the movable member, a spring for moving the dog into the path of the projection, and a stop mounted independently of the movable member for holding the dog against movement under the action of the spring.

3. A stop mechanism comprising a shifter for breaking connection between a driven and a driving member, a rotatable member having a projection thereon and movable with the machine to be stopped, a movable member for moving the shifter, a spring pressed dog on the movable member movable into the path of the projection, and a yielding stop arranged to hold the said dog out of the path of the projection and mounted independently of the movable member.

4. A stop mechanism comprising a shifter for breaking connection between a driving and a driven member, a rotatable member having a projection thereon and adapted to move with the machine to be stopped, a rotatable member for operating the shifter, a spring pressed dog carried by the last named rotatable member, a stop for holding the dog against movement, and a pawl for holding the dog-carrying member in such a position that the dog coöperates with the stop.

5. A stop mechanism comprising a shifter for breaking connection between the driving and the driven member, a rotatable member having a projection thereon and adapted to move with the machine to be stopped, a member rotatable about an axis coincident with the first named rotary member, a cam surface on the second named rotary member, for coöperation with the shifter, a spring pressed dog arranged on the cam-carrying member and movable into the path of the projection, a stop adapted to coöperate with the dog to hold it out of the path of the projection, and a pawl adapted to coöperate with the cam carrying member to hold the dog against the stop.

DANIEL M. COOPER.

Witnesses:
 ROBT. V. LYON,
 R. G. STALLKNIGHT.